April 12, 1927.
H. SUIDA
1,624,812
METHOD OF CONCENTRATING DILUTE ACETIC ACID
Filed Feb. 9, 1926   2 Sheets-Sheet 1
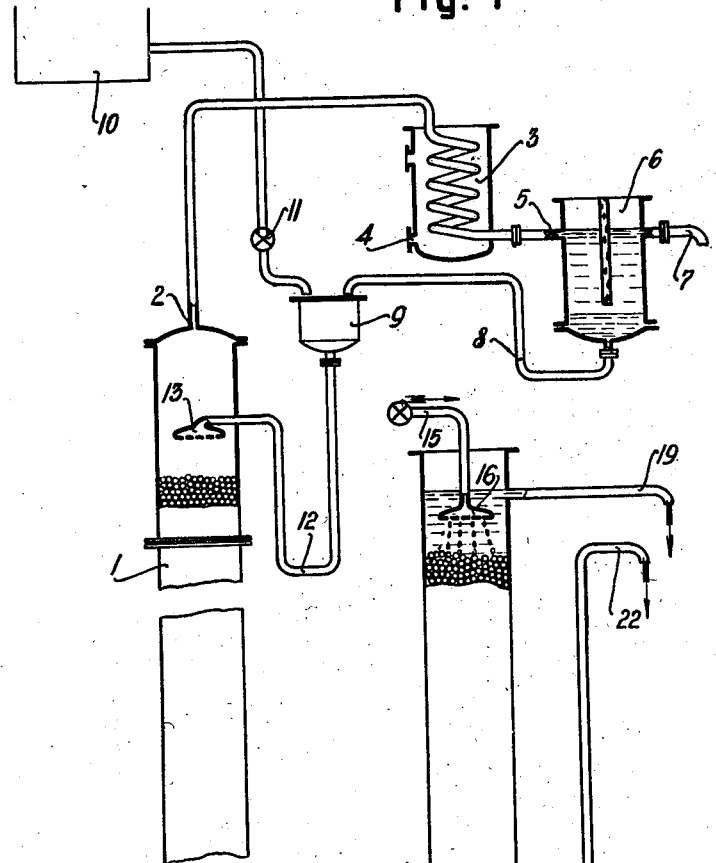
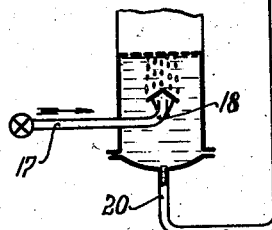
Inventor
Hermann Suida
By James L. Norris
Attorney April 12, 1927.  H. SUIDA  1,624,812
METHOD OF CONCENTRATING DILUTE ACETIC ACID
Filed Feb. 9, 1926  2 Sheets-Sheet 2

Inventor
Hermann Suida
By
James L. Norris
Attorney

Patented Apr. 12, 1927.

1,624,812

UNITED STATES PATENT OFFICE.

HERMANN SUIDA, OF MODLING, NEAR VIENNA, AUSTRIA.

METHOD OF CONCENTRATING DILUTE ACETIC ACID.

Application filed February 9, 1926, Serial No. 87,122, and in Austria February 21, 1925.

In the specification of my patent application Serial No. 12180, filed February 27, 1925, I have described a method in which the acetic acid is extracted from a superheated mixture of acetic acid and water vapour by means of oils which are sparingly soluble or insoluble in water and which have a boiling point which is substantially higher than that of acetic acid, in which case the acetic acid passes over, practically completely, into the extraction agent in a concentration of 80-90%, being subsequently separated from the latter, in known manner, by distillation. In the application of this method the water vapours, freed from the acetic acid, escape from the top of the extraction apparatus (extraction column). Most of the extraction agents (oils), applicable for this method, are however, more or less volatile with water vapour, in spite of their high boiling points. Thus, for example, tar-cresol, which boils between 180–200° C., i. e., at a considerably higher boiling point than pure acetic acid itself, when employed as extraction agent for acetic acid (for which purpose it is very well suited), is carried away by the water vapours in quite considerable quantities. If, for example, the water vapours which escape from the top of the extraction apparatus (the column), are condensed in a cooler, the greater portion of the cresols, carried away by the water vapours, separates out after condensation from the condensed water, or the initially existing emulsion of water and emulsified cresol separates quickly into a specifically heavy layer of cresol of small compass and in a super-imposed, specifically lighter layer of water, which constitutes the chief amount of the condensed liquid. A small quantity of the cresol remains, however, dissolved in the water. The same phenomena appear in a smaller or larger degree with most of the extraction agents, which come under consideration for the mentioned extraction method, due to their greater or less volatility with water vapours.

The method of the present invention makes it possible to practically completely recover from the water vapor condensates the extraction agent, thus extracted during the extraction process. The method is naturally divided into two operations, one of which has to do with the recovery of the extraction agent emulsified in the vapour condensates and its return into the extraction process, while the other deals with the recovery of the extraction agent dissolved in the aqueous condensate and its return into the extraction process.

The separation of the extraction agent, emulsified in the vapour condensates, takes place continuously by employing a separating apparatus of the "Florentine receiver" type, in such a manner that said separating apparatus is connected to the cooler or condenser, which may also serve for preheating purposes, in which case the separated extraction agent is continuously returned through a discharge siphon into the extraction column at the top of the latter. The extraction agent, if heavier than water, would be drawn off at the bottom of the separating apparatus or, if lighter than water like oleic acid would be drawn off at the top of said apparatus.

The method is illustrated, by way of example, in the Figs. 1–3 of the accompanying drawings.

Fig. 1 is a diagrammatic view showing the apparatus for separating the emulsified extraction agent and for returning the same into the extraction column connected to the extraction apparatus for the acetic acid extraction.

Fig. 2 is a similar view of the extraction column for the recovery of the extraction agent dissolved in water.

Figure 3:
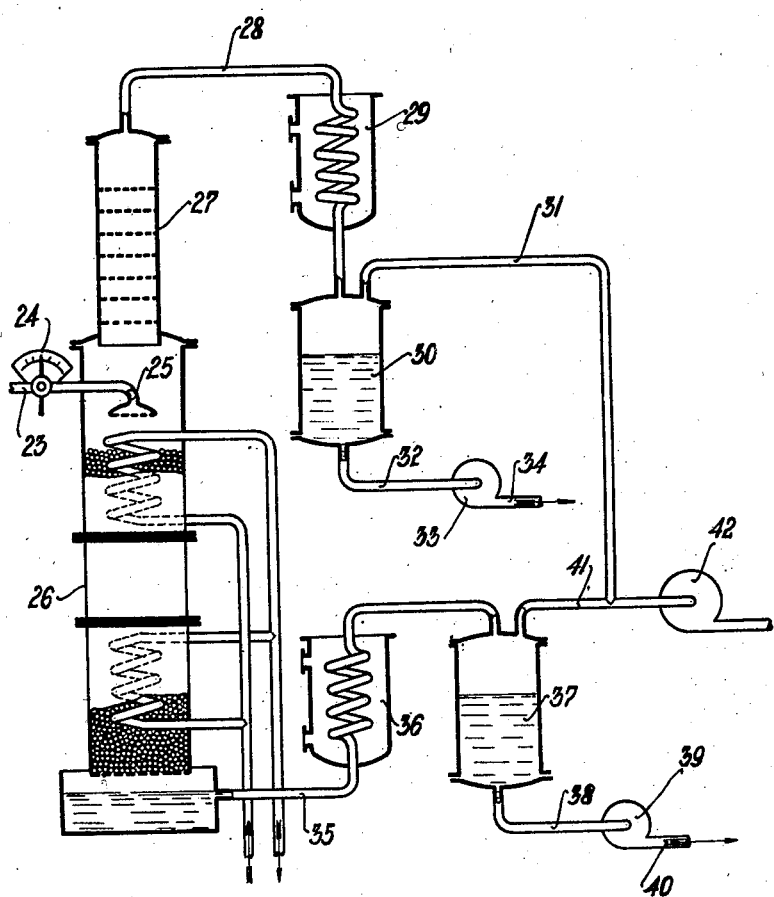

In Fig. 1, 1 denotes the extraction column from the upper end 2 of which the water vapours, freed from acetic acid and carrying along with them the extraction agent, pass out through a tube to a condenser 3 where they are condensed. The condenser 3 is fed at 4 with either a liquid to be preheated or with cooling water. The vapours need only be completely condensed in the condenser 3, but they need not be essentially cooled. The separation can be effected at various temperatures. The condensates leave the condenser 3 at 5 and are conducted to a separating vessel 6. Where an extraction agent of higher specific gravity than water is employed, the aqueous condensate, freed from the emulsified extraction agent, will continuously leave the separating vessel 6 at 7, while the specifically heavier extraction agent, separating from the emulsion at the lower portion of the separating vessel 6, is continuously discharged through the outlet siphon 8 into the vessel 9. Fresh extraction agent is continuously supplied to the vessel 9 from a reservoir 10 by suitably adjusting the valve 11, and consequently fresh extraction agent unites, in the vessel 9, with that separated from the condensate so that they enter the extraction column together at the upper end of the latter through the inlet siphon 12 and the distributor 13.

From the aqueous condensate, freed from the emulsified extraction agent, the extraction agent still dissolved in the water must now be recovered by suitable means. According to the present invention this is effected by treating the aqueous liquid on the counter-flow principle, at ordinary, moderately raised or lowered temperatures with a liquid which, under these conditions, will be practically insoluble in water and has a specific gravity different from that of water. Such a liquid should be used as will extract practically completely even the last dissolved traces of the extraction agent. This liquid is hereinafter, for short, termed "solvent" in contradistinction to the above mentioned extraction agents for acetic acid.

Solvents which are suitable are all kinds of fatty oils, such as rapeseed oil, olive oil, sesame oil, and others, liquid fatty acids of higher carbon content, such as oleic acid; and tar oils of high boiling point, such as anthracene oil or mineral oils of high boiling point, for example, the less viscous mineral lubricating oils. Mixtures of the aforesaid substances may, however, be also employed. All these substances are practically insoluble in water at normal, reduced or moderately increased temperature, or their solubility in water amounts to not more than a few hundredths or tenths per 1000. On the other hand, these solvents, will, when intimately contacting with water, extract practically completely the extraction agents contained in the water, especially if these latter are substances containing hydroxyl groups of phenolic character, so that the traces of the extraction agent left in the water amount only to about a hundredth or tenth per 1000. In this manner it is possible to so completely recover the extraction agent employed in the acetic acid extraction and to return it into the extraction process; that the loss of extraction agent together with the loss of solvent of the mentioned character does not amount to more than 0.01 to 0.1 parts per 100 parts of diluted acetic acid treated according to the process.

For the part of the process just mentioned an extraction column charged with filling materials may be employed, in order that the liquids flowing through the column are forced to travel over a manifolded interrupted long path, and are brought into a very finely divided state and intimate contact with one another.

Such apparatus are known and will only be described with reference to Fig. 2 in order to make clear the working of this cold-extraction.

The specifically heavier liquid, viz: the aqueous condensate to be extracted, flows continuously into the column 14 through the tube 15 and a distributor 16. The specifically lighter liquid, for example, oleic acid, is introduced into the column at the lower part of the latter through the tube 17 and the distributor 18. When the column is filled with liquid, the specifically lighter liquid (oleic acid) entering at 18, rises in small bubbles through the specifically heavier liquid with which the column is filled, accumulates at the top of the column and, laden with the extraction agent extracted from the water, flows out through the tube 19. The aqueous liquid, on the other hand, accumulates in the lower part of the column and, freed from the dissolved extraction agent, continuously flows out through the tube 20 or through the discharge siphon 21 at 22. The apparatus may be so operated that the column is first filled with aqueous liquid and the specifically lighter liquid is allowed to rise in the aqueous liquid, but the working may be in reverse order so that the column is first filled with the solvent and the aqueous, specifically heavier liquid is allowed to precipitate in the solvent. If a solvent of higher specific gravity than water, for example, anthracene oil is employed, it will be obvious that the solvent must be introduced at the upper end of the column, in which case the aqueous liquid rises from the bottom through the column.

Although the water entirely freed from the dissolved acetic acid extraction agent may be allowed to flow away, it becomes necessary to recover the acetic acid extraction agent from the solvent. Such recovery is suitably effected by distillation, advantageously in vacuum. This separation proceeds smoothly, because all the solvents mentioned have much higher boiling points than those of the acetic acid extraction agents which have any noteworthy solubility in water. The operation of carrying out a continuous separation of the extraction agents and the solvents by means of distillation in vacuo is represented by way of example in Fig. 3. The mixture of liquids for separation is continuously drawn in, by the vacuum prevailing in the distilling apparatus, through the tube 23 by an exact adjustment of the valve 24 and enters the upper end of the separating column 26 at 25. This separating column, which is provided with filling bodies, is heated, for example by means of two or more coiled tubes, through which steam or hot water is circulated. The mixture of liquids trickles from 25 over the filling bodies down through the separating column 26 and in this way the extraction agent contained in the solvent and having a considerably lower boiling point than the latter, is completely evaporated and escapes through a short superimposed intensifier column 27 charged with filling bodies, capsules or like devices, wherein the solvent, of which particles perhaps are carried away with extraction agent vapours, are separated and caused to flow back into the separating column 26. The vapours of extraction agent escape through the tube 28, are condensed in a cooler 29 and collected in a vessel 30. This vessel is connected by means of a conduit 31 with a vacuum pump 42, while the condensate (recovered extraction agent) is continuously removed through the tube 32 by the regulable pump 33 connected to the outlet 32. The solvent freed from the extraction agent collects at the bottom of the separating column 26 and is directed through the tube 35 into the cooler 36 wherein it is cooled to the desired temperature. The cooled solvent then enters a vessel 37 from which it is removed continuously at 40 through a tube 38 by means of a regulable pump 39. The vessel 37 and the vessel 30 are connected to the vacuum pump 42 by means of the tubes 41 and 31, respectively.

Although Fig. 3 illustrates an apparatus which is adapted for the purpose mentioned, the arrangements may also be made in a different manner. For example, by a correspondingly high positioning of the distilling column, the liquids could be removed from the vessels 30 and 37 by down pipes from the vacuum, or instead of the pumps 33 and 39, intermittent receivers may be provided for the extraction agent as well as for the solvent, which receivers may be intermittently filled and discharged.

It is obvious that when employing for the extraction of acetic acid, extraction agents (for example, oleic acid) which, although somewhat volatile with water vapours, are practically insoluble in water at normal or moderately increased temperature, only the first part of the method described, i. e. the separation of the emulsion and the return of the extraction agent into the extraction apparatus, and not the recovery of the extraction agent from the water by a solvent is to be taken into consideration.

What I claim as new and desire to secure by Letters Patent is:—

1. A method of manufacturing concentrated acetic acid from diluted acetic acid by extracting the acid from a superheated mixture of acetic acid and water vapor by acetic acid solvents having higher boiling points than that of acetic acid and being substantially insoluble in water, which consists in condensing the water vapors issuing from the extraction process and containing some volatilized acetic acid extraction agent, allowing the condensate to stand to permit the main portion of the extraction agent to separate out as a separate layer, and then removing the water layer still containing some extraction agent and subjecting it to an extraction with a solvent for the said acetic acid extraction agent.

2. A method of manufacturing concentrated acetic acid from diluted acetic acid by extracting the acid from a super-heated mixture of acetic acid and water vapor by acetic acid solvents having higher boiling points than that of acetic acid and being substantially insoluble in water, which consists in condensing the water vapors issuing from the extraction process and containing some volatilized acetic acid extraction agent, allowing the condensate to stand to permit the main portion of the extraction agent to separate out as a separate layer, then removing the water layer still containing some extraction agent and subjecting it to an extraction with a solvent for the said acetic acid extraction agent, and then distilling the solution of the acetic acid extraction agent in vacuo to recover the acetic acid extraction agent.

3. A method of manufacturing concentracted acetic acid from diluted acetic acid by extracting the acid from a super-heated mixture of acetic acid and water vapor by tar cresol, which consists in condensing the water vapors issuing from the extraction process and containing some volatilized tar cresol, allowing the condensate to stand to permit the main portion of the tar cresol to separate out as a separate layer, then removing the water layer still containing some tar cresol and subjecting it to an extraction with oleic acid, and then distilling the solution of the tar cresol in oleic acid in vacuo to recover the tar cresol.

In testimony whereof I have signed my name to this specification.

HERMANN SUIDA.